UNITED STATES PATENT OFFICE.

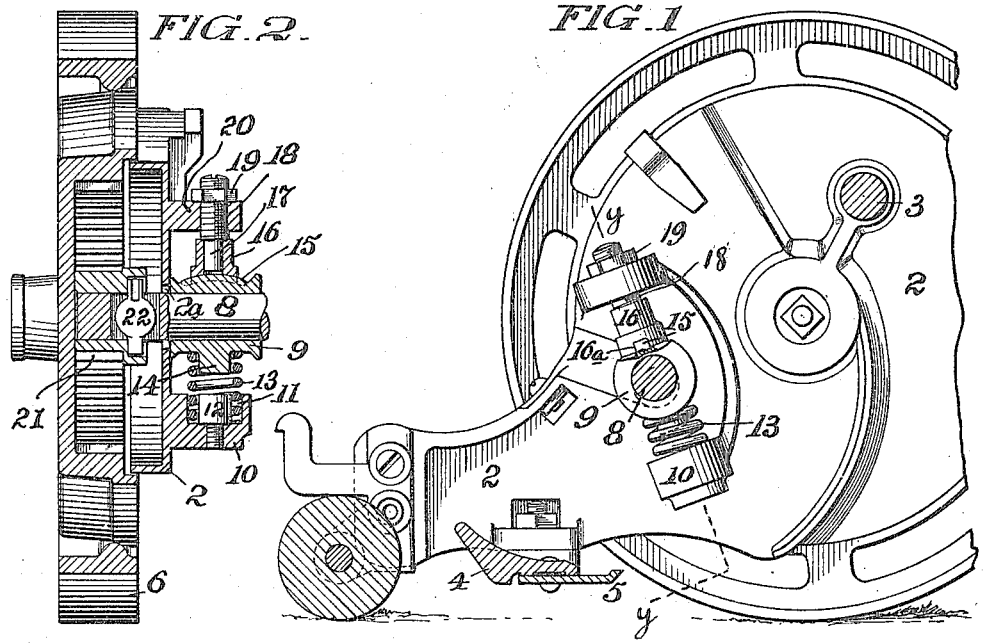

WILLIAM P. M. BRAUN, OF PHILADELPHIA, PENNSYLVANIA, ASSIGNOR, BY MESNE ASSIGNMENTS, TO PENNSYLVANIA LAWN MOWER WORKS, A CORPORATION OF PENNSYLVANIA.

LAWN-MOWER.

1,206,508.   Specification of Letters Patent.   Patented Nov. 28, 1916.

Application filed February 2, 1916. Serial No. 75,642.

*To all whom it may concern:*

Be it known that I, WILLIAM P. M. BRAUN, a citizen of the United States, and resident of Philadelphia, county of Philadelphia, and State of Pennsylvania, have invented an Improvement in Lawn-Mowers, of which the following is a specification.

The object of my invention is to provide an improved construction of journal support for the rotating cutter of a lawn mower, which shall facilitate the adjustment of said rotating cutter in respect to the stationary cutter, and at the same time insure a maximum freedom of rotation so as to make the machine light running in operation.

More specifically my object is to so support the rotary cutter that it is under spring action to tend to move it away from the stationary cutter, but so combined with adjusting means acting upon the bearings that the spring action is restricted and the rotary cutter may be adjusted into accurate cutting relation with the stationary cutter. By reason of this capacity of my invention, the attendant is only required to adjust two screws to the extent sufficient to bring the rotating cutter into cutting relation with the stationary cutter, thereby making the necessary adjustment simple and easy of accomplishment by a person of the most ordinary intelligence.

It is also my object to provide a construction for so supporting the rotary cutter with respect to the stationary cutter that normally the rotary cutter may be spring supported out of contact with the stationary cutter, and be adjusted toward the said cutter by a positive non-yielding screw adjustment of the bearings against the action of the springs, whereby a most delicate adjustment between the cutters may be had to provide accurate cutting coöperation which cannot be interfered with by any abnormal quantity or toughness of grass between the cutters; and further, providing a form of screw adjustment toward the stationary cutter so that the cutters are normally out of contact until the proper coöperation is secured, with the result that neither cutter is injured in making the adjustment, and a workman of most ordinary intelligence may make a perfect adjustment by the "feel" of the contacting edges, in other words my invention resides in providing a floating rotary cutter normally out of contact with the stationary cutter and which may be adjusted into coöperation therewith by a screw adjustment and then held in a rigid manner up to its said working adjustment.

With the above and other objects in view, the nature of which will be more fully understood from the description hereinafter, the invention consists in the novel construction of lawn mower as hereinafter more fully described and defined in the claims.

Referring to the drawings:—Figure 1 is a transverse sectional view of my improved lawn mower taken on line $x$—$x$ of Fig. 3; Fig. 2 is a sectional view of one side of the machine taken on line $y$—$y$ of Fig. 1; and Fig. 3 is a plan view of a lawn mower embodying my invention with the operating handle removed.

2, 2, are the two side frames and are connected by the transverse bar 3 and the cutter bar support 4 to which the stationary cutter 5 is riveted or otherwise secured. No adjustment is required to the cutter 5 after it has once been set and secured in position. The side frames 2, 2, are respectively supported by the usual drive wheels 6, 6, the latter being journaled to the frames and adapted to drive the pinions 21 in any well known manner, said pinions loosely supported upon the end of the journals 8 of the rotary cutter 7 and keyed thereto by the adjustable keys 22 or in any other suitable manner.

Considering now the means for supporting and adjusting the rotary cutter 7, the journals 8 at each end are supported in a similar manner and therefore a description of the construction adjacent to one end will suffice. The journal 8 is journaled in a bearing 9 the end of which fits reasonably close to the side plate of the frame 2. The bearing 9 is provided on its lower side with a hub 14 which is received within the open end of a coil spring 13. The lower end of the spring 13 is seated in the annular groove 11 formed by the recessed lug 10 and the central stud 12 secured to the lug within the recess. The spring 13 is positioned by the stud 12, the latter being machined to permit easy movement of the spring, but this stud is more especially employed to insure correct support of the spring by the lug, this being secured by properly positioning the stud within the recess of the lug.

The upper part of the bearing 9 is provided with a curved guide rib 15, the plane of which is alined with the axis of the rotating journal 8 of the revolving cutter, as will be clearly understood by reference to Figs. 1 and 2. Fitting over the curved guide rib is a sleeve 16 whose lower edge is grooved as at 16ª for proper reception of the rib 15. Arranged immediately above the sleeve 16 and forming an integral part with the casting 2 is a lug 20, through which extends a screw-threaded stud 18 having at its lower end a smooth stem 17 which snugly fits a corresponding hole in the sleeve 16. The stud 18 has its axis in alinement with the axis of the bearing 8 of the rotating cutter, and the shoulder between the screw-threaded portion of the stud 18 and the stem 17 rests directly upon the upper annular surface of the sleeve 16 and presses it downward upon the rib 15 of the bearing 9. By adjusting the screw-threaded stud 18 in the lug 20, the bearing 15 may be forced downwardly against the action of the spring 13, or may be permitted to rise under the action of said spring, and when the proper adjustment is made to insure the rotary cutter 7 properly coöperating with the stationary cutter 5, the stud 18 may be locked in adjusted position by the lock nut 19. As shown, it is preferable that the screw-threaded stud 18 shall be slotted at its upper end so that an ordinary screw driver may be employed for rotating the stud, but I do not limit myself in this respect. The amount of vertical adjustment is relatively small, being only to insure the cutting edges of the blades of the rotary cutter 7 and of the stationary cutter 5 properly coöperating, and therefore the aperture 2ª may be relatively small and preferably slightly elongated in the direction of the axis of the adjusting stud 18. It will further be observed that the axis of the adjusting stud 18 and of the fixed stud 12 are coincident, so that the upward thrust of the spring 13 is effective in the direction of the axis of the adjusting stud 18, thereby insuring a proper adjustment of the bearing and cutter without distortion due to lateral displacements, as would occur if this accurate alinement were not insured.

The bearings for both ends of the revolving cutter are independently adjustable so that each one can be adjusted separately and in that manner accurately position the revolving cutter in its relation to the stationary cutter, and moreover, as there is only a single adjustable screw stud to be adjusted at either end, it is a matter of very simple manipulation to insure the cutters being properly adjusted. The gravity action of the revolving cutter is constantly supported by the springs 13 acting on the bearings from below, said springs tending to raise the cutter away from the stationary cutter 5 and controlled by the adjusting screw studs 18. The upward thrust of the bearings 9 is received upon collars 16 on the lower ends of the screw studs 18; and by said screw studs, the adjustment of each end of the rotary cutter relatively to the stationary cutter 5 may be independently and accurately made while the machine is in its normal position upon the ground. By the provision of the non-yielding adjusting screw studs for the bearings at each end of the machine, the rotary cutter 7 cannot be forced apart from the stationary cutter 5, but will at all times be maintained in accurate cutting relation and only require adjustment to compensate for wear or for loss of the cutting edge through re-grinding.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a lawn mower, the combination of the general framing of the machine comprising two side frames each having two laterally projecting lugs, a normally fixed cutter bar extending transversely between the side frames, a rotatable cutter arranged above the stationary cutter bar and coöperating therewith and having at each end journals by which it is supported and may be driven, bearings through which the journals extend, a spring below each of the bearings and supported by one of the lugs on the side frames for forcing said bearings upwardly to move the rotatable cutter away from the stationary cutter bar, and adjusting screw studs extending downwardly through the remaining lugs of the side frames for forcing the bearings downwardly against the action of the springs for accurately adjusting the rotatable cutter and providing an adjustable abutment to prevent movement of the axis of the rotatable cutter from the cutter bar.

2. In a lawn mower, the combination of the general framing of the machine comprising two side frames each having two laterally projecting lugs, a normally fixed cutter bar extending transversely between the side frames, a rotatable cutter arranged above the stationary cutter bar and coöperating therewith and having at each end journals by which it is supported and may be driven, bearings through which the journals extend, a spring below each of the bearings and supported by one of the lugs on the side frames for forcing said bearings upwardly to move the rotatable cutter away from the stationary cutter bar, adjusting screw studs extending downwardly through the remaining lugs of the side frames for forcing the bearings downwardly against the action of the springs for accurately adjusting the rotatable cutter and providing an adjustable abutment to prevent movement of the axis of the rotatable cutter from the cutter bar, and adjustable connections between the adjusting screw studs and the bearings to permit oscillating adjustment of the bearings relatively to the studs.

3. In a lawn mower, a main frame, a fixed cutter bar, a rotatable cutter having a journal by which it is rotated, and an adjustable support for the journal consisting of a bearing through which the journal extends, a coil spring arranged below the bearing and supported by the main frame to force the bearing upwardly, an adjusting screw-threaded stud carried by the main frame and having its axis in alinement with the thrust of the spring, and a sleeve surrounding the bottom of the screw-threaded stud and forming a connection between it and the bearing whereby the position of the bearing against the action of the spring may be accurately adjusted and the rotatable cutter to properly coöperate with the stationary cutter bar.

4. In a lawn mower, a main frame, a fixed cutter bar, a rotatable cutter having a journal by which it is rotated, and an adjustable support for the journal consisting of a bearing through which the journal extends having at its upper part a curved rib in the plane of the axis of the journal, a coil spring arranged below the bearing and supported by the main frame to force the bearing upwardly, an adjusting screw-threaded stud carried by the main frame and having its axis in alinement with the thrust of the spring, and a sleeve surrounding the bottom of the screw-threaded stud and provided with a grooved end fitting over the curved rib and forming an adjustable connection with the bearing whereby the position of the bearing against the action of the spring may be accurately adjusted and the rotatable cutter to properly coöperate with the stationary cutter bar.

5. In a lawn mower, the combination of a main frame, a stationary cutter bar, a rotatable cutter coöperating therewith and having a journal at each end, bearings for the respective journals each having a projection on the bottom and a guide at the top in the plane of the axis of the journal, coil springs respectively surrounding the downwardly extending projections of the bearings and supported and positioned by extensions from the main frame, adjusting screw studs in alinement with the springs above the bearings and carried by the main frame, sleeves fitting the bottoms of the studs and shaped to engage the guide portions on the tops of the bearings, whereby the rotatable cutter has its weight supported by the springs and its position accurately adjusted by the screw studs.

6. In a lawn mower, the combination of the main frame, a stationary cutter bar carried thereby, a rotatable cutter having journals at its ends, bearings for each of the journals, spring supports between the main frame and the bottom of the bearings for sustaining the weight of the rotatable cutter and moving it away from the stationary cutter bar, and independent adjustable devices also carried by the main frame for positively limiting the upward movement of the respective bearings to limit the extent of upward adjustment of the rotatable cutter relatively to the stationary cutter bar and permit independent adjustment at the opposite ends thereof.

In testimony of which invention, I hereunto set my hand.

WILLIAM P. M. BRAUN.

Witnesses:
R. M. HUNTER,
E. W. SMITH.

Copies of this patent may be obtained for five cents each, by addressing the "Commissioner of Patents, Washington, D. C."